United States Patent [19]

Peters

[11] 4,217,934
[45] Aug. 19, 1980

[54] PILOT VALVE MECHANISM FOR HIGH OR LOW PRESSURE CUT-OFF CONTROL

[75] Inventor: Clifford M. Peters, Longview, Tex.

[73] Assignee: W-K-M Wellhead Systems, Inc., Shreveport, La.

[21] Appl. No.: 8,197

[22] Filed: Jan. 23, 1979

Related U.S. Application Data

[63] Continuation of Ser. No. 888,092, Mar. 20, 1978, abandoned, which is a continuation of Ser. No. 741,925, Nov. 15, 1976, abandoned, which is a continuation-in-part of Ser. No. 560,598, Mar. 21, 1975, Pat. No. 3,996,965, which is a continuation of Ser. No. 410,182, Oct. 26, 1973, abandoned.

[51] Int. Cl.$^3$ .................... F16K 11/02; F16K 31/122
[52] U.S. Cl. .......................... 137/625.66; 137/625.69
[58] Field of Search .............. 137/458, 625.48, 625.66, 137/625.69

[56] References Cited

U.S. PATENT DOCUMENTS

| | | | |
|---|---|---|---|
| 2,524,142 | 10/1950 | Seeloff | 137/625.48 X |
| 2,614,539 | 10/1952 | Ernst | 137/625.66 X |
| 2,747,611 | 5/1956 | Hewitt | 137/625.69 |
| 3,661,182 | 5/1972 | Loveless | 137/625.48 |
| 3,746,047 | 7/1973 | Peters | 137/625.66 |

FOREIGN PATENT DOCUMENTS

569829 6/1945 United Kingdom ................ 137/625.69

*Primary Examiner*—Gerald A. Michalsky
*Attorney, Agent, or Firm*—Stephen T. Belsheim

[57] ABSTRACT

An improved pilot valve mechanism for controlling the flow of a pressure medium responsive to predetermined variations in a pressurized system. The pilot valve mechanism is constructed in such manner that a plurality of pilot valves may be connected in an assembly and may be operative to shut down operation of a flow system responsive to sensing of pressures that are above or below a predetermined range of operating pressure. Each of the valves may include a shuttle valve mechanism capable of interrupting fluid communication between the inlet and outlet of the pilot valve mechanism or between the outlet and vent thereof, depending upon the position of a shuttle valve actuating piston that is proportionally movable responsive to variations in the pressure that is sensed by the pilot valve mechanism. Movement of the shuttle valve actuating piston and the shuttle valve are controlled by an urging means that may be adjustably preset for a particular high or low pressure. The shuttle valve incorporates annular peripheral seal that is retained in assembly with the shuttle valve and engagable with and movable partly beyond annular sealing edges defined within the valve body of the valve assembly in order to control fluid communication between the various ports. Slight movement of the shuttle valve peripheral seal away from the annular sealing edges affords substantial cross-sectional flow area for large volume flow, thus providing for rapid pressure responsive actuation. Utilization of sealing elements having low friction characteristics and utilization of a low friction spring for urging the shuttle valve and piston between operative positions thereof, facilitates accurate operation of the pilot valve mechanism at relatively narrow pressure differentials.

5 Claims, 12 Drawing Figures

PILOT VALVE MECHANISM FOR HIGH OR LOW PRESSURE CUT-OFF CONTROL

CROSS REFERENCE TO RELATED APPLICATION

This is a continuation of pending application Ser. No. 888,092, filed Mar. 20, 1978, now abandoned, which is a continuation of patent application Ser. No. 741,925, filed Nov. 15, 1976, now abandoned. Application Ser. No. 741,925 is a continuation-in-part application of application Ser. No. 560,598, filed Mar. 21, 1975, now U.S. Pat. No. 3,996,965 dated Dec. 14, 1976. Application Ser. No. 560,598 is a continuation of application Ser. No. 410,182, filed Oct. 26, 1973, now abandoned.

FIELD OF THE INVENTION

This invention relates generally to pilot valves that are typically utilized to monitor pressure conditions in a pressurized system and to cause the pressurized system to shut or become blocked responsive to detection of operating pressures that are above or below a predetermined acceptable pressure range. More particularly, the invention is directed to the provision of a pilot valve mechanism for use in both high and low pressure sensing or in combination high and low pressure sensing which pilot valve mechanism facilitates a relatively large volume flow of control fluid for rapid actuation or deactivation of associated mechanical devices and at the same time effectively prevents displacement or fluid erosion of sealing elements in the pilot valve mechanism. The invention also relates but is not limited to pressure actuated pilot valve mechanisms having shuttle valve seals which contact sealing edges within the pilot valve body and have portions of the seals which move past the sealing edges. Additionally the invention is related to pilot valve mechanisms which pass fluid at a substantially high pressure which may be at least as high as pressure in an associated pressurized system.

BACKGROUND OF THE INVENTION

Pilot valve mechanisms which may also be referred to as control valves, have long been utilized for the purpose of automatically responding to pressure variations in a flow system and inducing actuation or deactivation of mechanical devices in the event a dangerous or undesirable pressure level is sensed. As is typically the case, pilot valves or control valves may comprise a valve body having a pressure responsive valve element disposed therein for controlling communication between the inlet, outlet and vent port of the valve, whereby a mechanical device, such as a valve actuator, may be energized by pressurized pilot fluid passing through the valve and may be deenergized by blocking application of the pressurized pilot fluid and by allowing pilot fluid to be vented from the mechanical device through the pilot valve mechanism.

As is typically the case, a piston within the pilot valve is provided with a plurality of annular grooves having O-rings disposed therein, which O-rings slide across the inlet, outlet and port openings of the valve, depending upon the position of the shuttle valve. When high operating pressures are involved, travel of the O-rings across the ports subject small areas of the O-rings to radial expansion due to the pressure differential acting on them as they travel across the port. This radial expansion of the O-rings causes them to be cut or nipped on their perimeter thus requiring frequent repair and replacement. Moreover, it has been determined that excessively large ports create extremely rapid wear of the O-rings, while ports that are sufficiently small to prevent excessive O-ring wear typically retard the flow of pressurized medium through the pilot valve mechanism and thus prevent rapid actuation of the mechanical device that is being controlled. Depending upon the particular pressure range at which the pilot valve mechanisms are to function, certain optimum port sizes have been developed that allow sufficient flow for actuation at acceptable speeds even though the speeds are not necessarily optimum. Accordingly, it is desirable at times to provide pilot valve mechanisms for actuator systems having the capability of allowing rapid flow of pilot fluid for rapid actuation without the attendant difficulties that are often associated with the use of sliding O-rings of conventional pilot valve mechanisms.

A problem typically associated with conventional pilot valve mechanisms is the tendency of O-rings to become completely displaced from their grooves as the result of excessive pressure differential or the tendency of such O-rings to become extruded from the groove to such extent that they become cut or excessively abraded as the O-ring slides passed various structural components of the pilot valve mechanism. It is, therefore, appropriate to provide a pilot valve mechanism having a facility for positively retaining O-rings in their proper position and for preventing such O-rings from becoming extruded from their grooves.

Where conventional O-rings are employed as dynamic sealing elements and are disposed in sliding engagement with a cylindrical wall defining a bore, such as is typically the case in most commercially available pilot valve mechanisms, the O-ring, after remaining stationary for a suitable period of time, will become adhered to the wall structure defining the bore to such extent that substantial pressure is necessary to break it loose and accomplish the desired actuation. Depending upon the characteristics under which the O-rings operate, it may require pressure in the order of 300 PSI to break certain O-rings loose from the wall structure of the bore and to achieve linear actuation of the piston carrying the O-rings. Of course, when the O-rings breaks loose and movement occurs, the piston typically slams the opposite position because of the pressure differential that is necessary to initiate piston operation. This usually results in erratic and undesirable operation of the pilot valve mechanism causing consequent erratic operation of the mechanical device with which the pilot valve is associated.

Sticking of O-rings is due largely to the fact that surface areas of piston bores have a certain degree of surface imperfection, depending upon the characteristics of the machining operation producing the bore. Sticking is also affected by temperature of the pilot valve as well as temperature of the fluid passing through the valve. Extreme high temperatures and extreme low temperatures increase the possibility of sticking due to changes in operating characteristics of an O-ring of a specific temperature. The material from which most O-rings are composed has a facility for extrusion into the surface imperfections and may have a characteristic of establishing a permanent or semi-permanent set after a certain period of time, thereby causing the O-ring to become mechanically adhered to the wall structure of the bore. It is desirable, therefore, to provide a sealing element having a material in sealing engagement with the bore, which material will be substantially frictionless, to allow relatively free movement of the piston in the bore and which material will not readily extrude into the surface imperfections of the piston bore and become adhered to such surface imperfections.

It is typical for compression springs to be employed in pilot valve mechanisms for imparting a force to a movable shuttle valve assembly that controls the flow of control fluid through the pilot valve mechanism. This is true primarily because the structure necessary for containing compression springs is much simpler and less expensive than other urging devices, such as tension springs, for example. Where control pressure ranges are fairly wide and exceptional repeatability is not a governing factor, pilot valve mechanisms incorporating compression spring devices for shuttle valve actuation are quite acceptable. They are less desirable when the opposite parameters are controlling.

When the coils or convolutions of typical compression springs overlap, it is obvious that the spring rate of the spring is substantially altered. When this occurs, a pilot valve mechanism will also have altered pressure responsive characteristics which may render the valve completely unacceptable for the service for which it is intended. Alteration of the pressures to which the pilot valve mechanism will respond, may create an unsafe condition if the altered response pressure of the valve is excessively high or low. If the shuttle travel of the valve mechanism is great enough to create a condition where coil inteference of the compression spring can occur, it may be undesirable to place such a valve mechanism in a critical environment.

Another undesirable pilot valve pressure responsive condition results when compression springs of pilot valves bend or buckle to such extent that the spring is allowed to rub against an internal surface of the valve mechanism or against a surface of a spring guide. When this occurs, the frictional rubbing engagement of the spring against another surface will substantially alter the spring rate of the spring and will interfere with normal spring function. The occurrence of spring rubbing will obviously modify the pressure range to which the pilot valve mechanism will respond and will frequently render such pilot valve mechanisms undesirable for use in environments where accurate pressure response is critical. Spring rubbing has the effect of broadening the range of pilot valve pressure response which renders compression spring type pilot valves undesirable if the high and low pressures to which the valve must respond are narrowly spaced. Rubbing of the spring will generally create sufficient frictional interference that pilot valves, so constructed, will not respond accurately to low pressures.

Accordingly, it is a primary object of the present invention to provide a novel pilot valve mechanism suitable for both high and low pressure actuation, wherein the pilot valve mechanism employs a piston and sealing arrangement allowing a large amount of flow to occur through the pilot valve mechanism with minimal pressure responsive movement of the piston and valve assembly thereof.

Also, it is another primary object of the present invention to provide a novel pilot valve mechanism suitable for operation with a pressurized fluid in the range of two hundred (200) pounds per square inch (PSI) to five thousand (5,000) PSI.

It is another important object of the present invention to provide a novel pilot valve mechanism employing sealing elements that promote effective substantially friction-free sealing, promote ease of valve and piston actuation and which do not tend to adhere to the wall structure of the valve mechanism and interfere with relatively free piston and valve movement.

Among the several objects of the present invention is noted the contemplation of a novel pilot valve mechanism developing a flow passage through the valve upon opening of a shuttle valve mechanism, which flow passage is of a dimension at least as great as the dimension of the inlet, outlet or vent ports of the valve mechanism in order to facilitate maximum fluid flow for rapid shut-in of a mechanical device associated with the pilot valve mechanism.

It is an even further object of the present invention to provide a novel pilot valve mechanism employing an urging means to oppose movement of the piston and valve mechanism of the pilot valve assembly and which cooperates with the piston and pilot valve mechanism to facilitate effective and accurate operation in narrow ranges of pressure differential operation of the valve mechanism and to achieve accurate high and low pressure operation repeatability.

It is also an important object of the present invention to provide a novel pilot valve mechanism incorporating a tension spring mechanism for imparting a pressure controlling force to a shuttle valve mechanism, which tension spring mechanism is not affected by friction interference and coil override and is accurately responsive a full range of fluid pressures.

It is also an important object of the present invention to provide a pilot valve mechanism that is of simple construction, is reliable in use and low in cost.

Other and further objects, advantages and features of the present invention will become apparent to one skilled in the art upon full consideration of the matter disclosed herein. The form of the invention, which will now be described in detail, illustrates the general principles of the invention, but it is to be understood that this detailed description is not to be taken as limiting the scope of the present invention.

SUMMARY OF THE INVENTION

A preferred embodiment of the present invention may comprise a pilot valve body within which may be defined an elongated passage which is disposed in fluid communication with the fluid pressure of a pressurized system. A piston element may be disposed within the elongated passage and may include annular sealing means disposed in engagement with the wall of a bore defining a part of the passage, whereby the piston element may be movably responsive to pressure variations within the pressurized system. A spring, that is adjustable for determination of the pressure at which the particular valve may operate, acts through an actuator stem on a shuttle valve interposed between the actuator stem and piston to oppose movement of the piston and allow piston movement and, consequently, valve movement to be proportional to the pressure variations occurring in the pressurized system.

The pilot valve mechanism may employ a shuttle valve having seals, disposed at opposite end portions of a central body portion. The seals are disposed for sealing contact with annular sealing surfaces defined within the valve body. The dimension of the annular sealing surfaces and the chamber within which the valve element is movable is chosen such that upon slight movement of the seal elements away from the annular sealing surfaces a fluid flow area will be developed that is at least as great as the dimension of the individual ports, thereby allowing maximum fluid flow through the pilot valve mechanism and ensuring rapid actuation of the mechanical device with which the pilot valve mechanism is associated.

The spring that opposes pressure responsive movement of the piston and shuttle valves may conveniently take the form of a tension spring, rather than a compression spring as is typically employed, which tension spring cooperates with the shuttle valve and piston assemblies to ensure precise responsiveness and repeatability of the pilot valve mechanism and ensures efficient operation under circumstances where the mechanical device, with which the pilot valve mechanisms are associated, may function efficiently and accurately even though relatively narrow ranges of pressure differential are involved.

Relatively friction-free sealing elements, carried by the piston of the valve mechanism and disposed in sliding contact with a bore within which the piston is disposed, may incorporate an annular sealing band disposed within around the piston and having the outer periphery thereof disposed in sealing engagement with other seals inside the bore. The annular sealing band may have an inwardly extending groove at each extremity thereof serving to retain an O-ring element, that is also disposed within the annular groove, to prevent the O-ring element from being displaced from the annular groove by fluid pressure. The annular sealing band may also be a cylindrical portion of the shuttle valve alternately disposable in sealing contact between annular sealing edges in the bore.

BRIEF DESCRIPTION OF THE DRAWINGS

So that the manner in which the above recited features, advantages and objects of the present invention, as well as others, which will become apparent, are attained and can be understood in detail, more particular description of the invention, briefly summarized above, may be had by reference to the embodiments thereof which are illustrated in the appended drawings, which drawings form a part of this specification.

It is to be noted, however, that the appended drawings illustrate only typical embodiments of the invention and are therefore not to be considered limiting of its scope, for the invention may admit to other equally effective embodiments.

IN THE DRAWINGS

BRIEF DESCRIPTION OF THE RELATED PATENT APPLICATION

Figure 1:
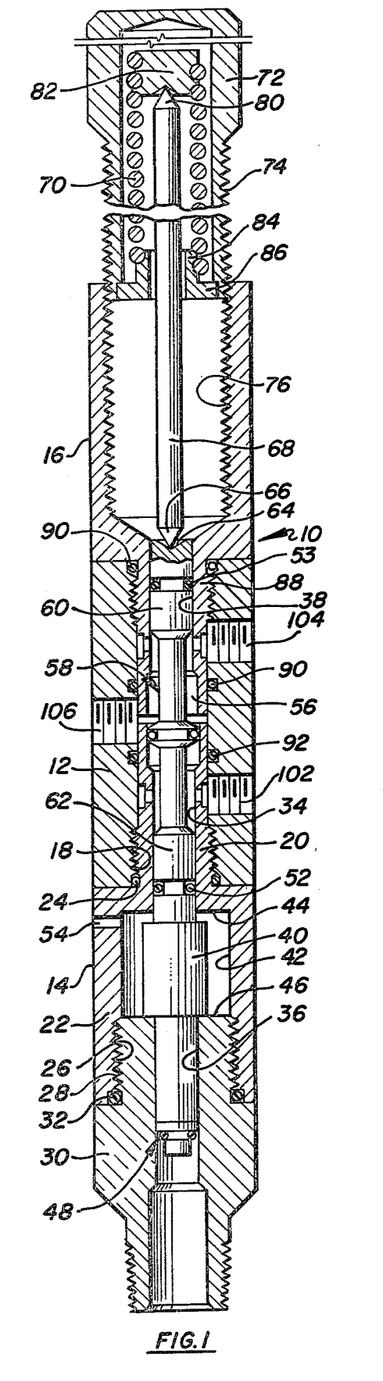
FIG. 1 is a partial sectional view of a pilot valve mechanism connected to a support and pressure communicating manifold block; the pilot valve mechanism having portions thereof broken away and shown in section.

Illustrated in FIG. 1, of the related application, is a typical high-low pilot valve assembly including a low pressure responsive pilot valve mechanism, illustrated on the right-hand portion of the figure, and a high pressure sensitive pilot valve mechanism, illustrated on the left-hand portion of the figure, both of which are substantially identical in construction and are threadedly connected to a pressure conducting manifold and support block having a passage therein and being in communication with a manifold and support block inlet through which pressurized fluid is connected from a pressurized system for which operation control is desired. For example, a pressure conducting conduit may communicate pressurized fluid from a flow line that is controlled by a valve and valve actuator assembly to the chamber defined by the passageway inside the manifold and support block. This pressure is communicated into the high and low pressure pilot valves simultaneously. Depending upon whether the pressure sensed is within the limits defined by the high and low pressure pilot valve, then the pilot valves will allow communication of a pilot supply pressure source with the valve actuator, thereby maintaining the actuator in an operative condition or the pilot valves will vent the fluid to maintain the actuator in a inoperative condition.

In the event the pressure should rise above an acceptable level or fall below an acceptable level, one of the pilot valve mechanisms will interrupt flow from the pilot supply source to the actuator and will communicate the actuator with a vent, thereby allowing venting of the actuator pressure and causing automatic movement of the actuator to a position closing the valve with which it is associated. As shown, the pressure being sensed is within the predetermined acceptable pressure range and, therefore, fluid is communicated from a pilot supply source through the low pressure pilot valve, through a connecting conduit and through the high pressure pilot valve mechanism to a pilot pressure supply conduit that is in communication with the valve actuator. The high and low pressure pilot valve mechanisms, as shown in FIG. 1 of the related patent application are disposed in a "non-venting" position and the valve actuator, being controlled thereby, is therefore disposed in its operative position.

DETAILED DESCRIPTION OF THE INVENTION

Referring now to FIG. 1 of the accompanying drawings, the pilot valve mechanism of the present invention is indicated generally at 10 and incorporates an intermediate body portion 12 housing body sections 14 and 16 connected thereto. Intermediate body portion 12 has an internally threaded extremity 18 that receives the externally threaded axial extension 20 of an intermediate connector element 22. Intermediate connector element 22 is sealed with respect to body portion 12 by means of an annular sealing element 24 that may conveniently take the form of an O-ring received within an annular groove formed on the intermediate element. Intermediate connector element 22 may likewise have internal threads 26 formed at the lower extremity for receiving the externally threaded portion 28 of a lower connector element 30. An annular sealing element 32, such as an O-ring or the like, may establish sealed relationship between the lower connector element 30 and the intermediate connector element 22.

The intermediate connector element 22 may have an axial bore 34 formed therein that is disposed in co-axial relationship with an axial bore 36 defined within the lower connector element 30 and with an axial bore 38 defined in the body section 16. A piston element 40 may be disposed within an elongated passageway defined collectively by the bores 34 and 36 and by an enlarged bore 42 defined within the intermediate connector element 22. Piston element 40 may be disposed for axial reciprocation within limits defined by annular shoulders 44 and 46 defined respectively on the intermediate and lower elements 22 and 30. An annular enlarged portion of the piston element 40 will engage the surfaces 44 and 46 to limit movement of the piston element in either axial direction thereof.

At the lower extremity of the piston element, as illustrated in FIG. 1, an annular seal assembly is disposed about the piston element and establishes sealed engagement with the bore 36 thus preventing pressure sensed by the pilot valve from entering the valve chamber of the valve. This seal assembly 48 is of frictionless or low friction characteristics and is described in detail hereinbelow in connection with FIG. 4. At the upper extremity of the piston element 40 the perimeter is reduced in diameter, slidably retained in bore 34 and provided with an annular seal element 52 retained in a groove therearound to prevent pressure controlled by the pilot valve mechanism from escaping. Another annular sealing element 43 in the form of an O-ring is provided around the opposite end portion of the shuttle valve to prevent fluid leakage into the upper portion of the mechanism. A vent passage 54 is formed in the intermediate connector portion 22 and serves to vent any pressurized medium leaking past the sealing element 52 and seal assembly 48 thereby providing external indication that repair of the pilot valve assemble is necessary.

The design of the lower extremity of the piston structure may be varied within the scope of the present invention, depending upon the particular pressure range that is to be sensed by the pilot valve assembly. Where variations in high fluid pressures are to be detected, piston structure 40 may be of relatively small diameter, thus presenting a relatively small piston surfce area equivalent to the circular area defined by the bore that is acted upon by the pressurized medium being detected. Conversely, where variations in low pressure are concerned, the piston structure 40 and the piston seal assembly may be of a relatively large diameter, thus presenting a relatively large piston area which is equivalent to the circular area defined by the piston bore against which the pressurized medium is being detected. In all variations the piston area equivalent is selected in relation to the force developed by the spring system at the opposite end of the pilot valve.

Figure 2:
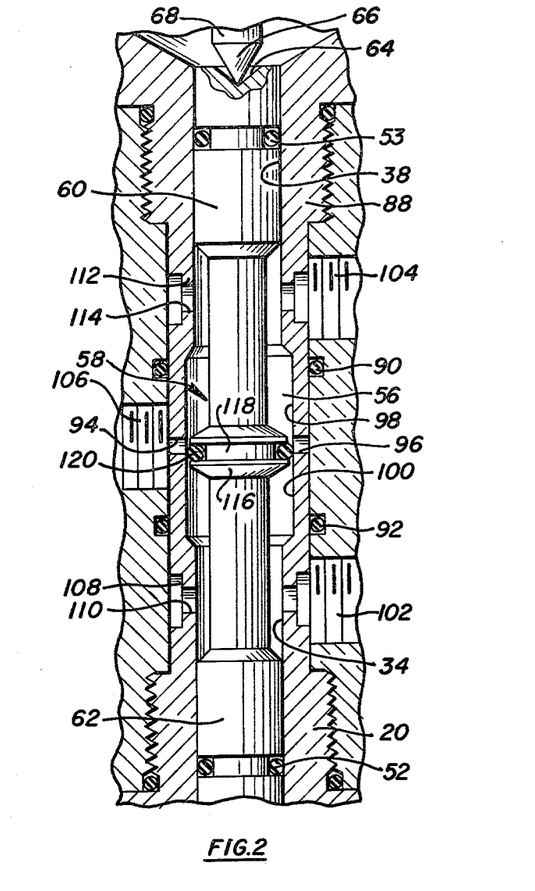
FIG. 2 is a fragmentary sectional view of a pilot valve mechanism shown in FIG. 1 illustrating the shuttle valve mechanism thereof in greater detail.

Axial bores 34 and 38 communicated with enlarged annular bore or chamber 56, which, together with the axial bores, may constitute a valve chamber. A shuttle valve assembly, illustrated generally at 58 and shown in enlarged detail in FIG. 2, is movably disposed within valve chamber 56 and, upon being moved, responsive to variations in pressure differential sensed by the pilot valve mechanism, may control the flow of actuating pressure, also referred to as pilot pressure, to a remotely located device for actuation thereof.

Shuttle valve support extensions 60 and 62 are provided on the shuttle valve 58. Support extension 60 has a depression 64 in the end thereof to receive a pointed support portion 66 of shuttle valve support element 68. Shuttle valve support element 62 is rigidly attached in axial alignment with piston element 40. Shuttle valve support element 62 can be integrally formed with piston element 40 if desired.

Shuttle valve support element 68 is positioned axially of bore 38. Shuttle valve support element 60 is urged downwardly by a tension spring 70 carried by a spring adjustment element 72. The tension spring 70, always being in tension, will not have any tendency to buckle or bend and, therefore, it will not be susceptible to rubbing friction contact with the internal surfaces of the valve mechanism nor will it have any tendency to establish rubbing contact with the stem 68. The spring rate of the tension spring will always remain stable and, therefore, the pressure response range of the pilot valve mechanism will not vary from its precise setting because of spring interference. Moreover, maintenance of the spring 70 in tension will effectively eliminate the problem of spring override and, therefore, will prevent convolutions of the spring from interfering with one another and otherwise altering the spring rate of the spring. Spring adjustment element 72 is provided with an externally threaded portion 74 disposed in threaded engagement with an internally threaded bore 76 defined in the upper extremity of upper valve body section 16.

At the upper extremity of the stem 68 is provided a frusto-conical portion 80 that may be received within a conical depression formed in a spring retainer element 82 that is in turn secured within the upper extremity of the tension spring 70. The lower extremity of tension spring 70 is secured to a spring retainer 84 having a lower annular flange 86 received within a corresponding recess in the lower portion of the adjustment element 72, thereby serving to positively restrain movement of the lower portion of the tension spring.

Upper body section 16 has an axial extension 88 threadedly engaged in intermediate body portion 12. A seal element in the form of an O-ring 90 is provided around axial extension 88 at the juncture of upper body section 16 and intermediate body section 12 to prevent fluid leakage to the exterior of the mechanism. Upper body section axial extension 88 is similar to intermediate connector element axial extension 20. Seal elements in the form of O-rings 90 and 92 are provided in grooves in intermediate body section 12 around axial extensions 88 and 20 respectively. Axial extensions 88 and 20 have adjacent ends thereof spaced apart with inner annular edges thereof defining annular sealing edges 94 and 96 respectively. Valve chamber 56 includes enlarged bore portions 98 and 100 at respective end portions of axial extensions 88 and 20 which join respective sealing edges 94 and 96.

A plurality of flow passages 102, 104, and 106 are disposed through body section 12 and axial extensions 88 and 20 in communication with the valve chamber 56 and, depending upon utilization of the valve mechanism for high pressure or low pressure responsive control or depending upon utilization of pilot valves in high-low pressure sensing combination, the ports may have different functions. For example, assuming the pilot valve mechanism to be utilized as the high pressure pilot valve of a high-low pressure pilot valve combination assembly, such as generally described above and set forth in FIG. 1, port 104 will represent an inlet port through which pilot fluid may flow from the low pressure pilot valve mechanism into the valve chamber 56. Port 106 will represent an outlet port through which fluid may flow from the valve chamber 56 to control the valve and actuator mechanism with which the pilot valve assembly may be associated. Port 102, under this circumstance, will represent a vent port through which fluid may be vented from the valve and actuator mechanism through the port 106 in the event of high pressure shut-in.

The intermediate connector element axial extension 20 is cut away to define an external annular groove 108 cooperating with the wall structure of the valve body portion 12 to define an annular chamber disposed in communication with the port 102. Fluid communication, between the annular chamber defined by the groove 108 and the valve chamber within which the shuttle valve is movably disposed, may be defined by one or more points 110, formed through the wall structure of the axially extending portion 20. A similar annular groove 112 may be formed in body section axial extension 88 and a similar port or ports 114 provided to establish fluid communication between valve chamber 56 and port 104.

Referring now specifically to FIG. 2, shuttle valve element 58 is disposed for reciprocal movement within valve chamber 56. Shuttle valve element 58 may incorporate an enlarged intermediate portion 116 having an annular groove 118 formed therein, which groove may receive an annular sealing element 120. The sealing element 120 may conveniently take the form of an elastomeric O-ring or any other suitable sealing device without departing from the spirit and scope of the present invention.

It is to be noted that annular sealing element or O-ring 120, when disposed in touching engagement with an annular sealing edge 96 of body axial extension 20, will be slightly spaced from the other annular edge 94 defined by the opposite body axial extension 88. This feature promotes rapid operation of the valve mechanism upon slight axial movement of the shuttle valve element 58, because it is only necessary that the O-ring 120 be moved a few thousandths of an inch in order to be brought into sealing engagement with the sealing edge of the opposite body axial extension. Full flow communication between the outlet port 106 and one of the high pressure or low pressure ports 104 and 102, respectively, may be effectively accomplished upon slight movement of the O-ring element, responsive to slight movement of the shuttle valve 58. Further movement of the shuttle valve in either direction will merely cause O-ring 120 to be moved within the respective bore defined within the appropriate valve body axial extension. Since opening and closing of the shuttle valve mechanism will occur upon slight movement of shuttle valve 58, it is obvious the pilot valve mechanism will be immediately responsive to slight pressure changes above or below the preset pressure level for which actuation of the valve mechanism is desired.

The shuttle valve assembly may achieve a sealing function by moving annular sealing element 120 into sealed abutment with respective annular sealing edges 94 and 96. The valve construction is such that a slight movement of O-ring sealing element 120, away from the respective annular sealing edge, will facilitate development of a flow passage of a dimension at least as great as the dimension of the valve ports 102, 104, and 106. This feature allows rapid development of sufficient flow passage dimension to allow maximum flow of pilot fluid from the valve and actuator mechanism during venting, thereby facilitating extremely rapid shut-in, responsive to sensing of undesirable pressure conditions. During tests, it has been determined that valve movement of as little as 0.020 inch is effective to achieve a flow passage dimension as great as the dimension of the inlet, outlet or vent ports.

In pilot valve mechanisms it is highly desirable to provide a mechanical apparatus that is responsive to sensation of pressure variations to provide a flow of pressurized control fluid or to allow control fluid to be bled from an acuator mechanism. It is also desirable that the pilot valve mechanism has exceptional repeatability, i.e., repeated actuation at precise pressure levels and that it be capable of functioning within relatively narrow ranges of pressures.

It is common to employ O-rings in pilot valve mechanisms for control of fluid flow therethrough and for separation of areas of unbalanced pressure such as in the lower portion of the pilot valve mechanisms shown herein. O-rings that slide against cylindrical surfaces to achieve sealing between movable elements are quite effective in operation, but tend to detract from desired features of repeatability and narrow pressure range operation of pilot valve assemblies, because of the substantial level of friction that is often developed between the O-rings and the respective sealing surfaces. It is also well known that O-rings tend to be displaced or squeezed from the annular grooves thereof as pressure applied to the O-rings is increased, which displacement causes the O-rings to enlarge and substantially increase in frictional sealing contact with the cylindrical surfaces against which the O-rings slide. This feature causes frictional interference to vary as pressure varies and, therefore, causes pressure responsive pilot valve operation to be erratic in nature.

The erratic nature of O-ring utilization is further evident because O-rings, when allowed to remain stationary for long periods of time, tend to stick to the sealing surfaces. Considerable pressure differential is typically necessary to break the O-rings loose from the sealing surfaces and such pressure differential obviously detracts from accurate operation of the pilot valve mechanism.

Figures 4, 5, 6, 7, 8:
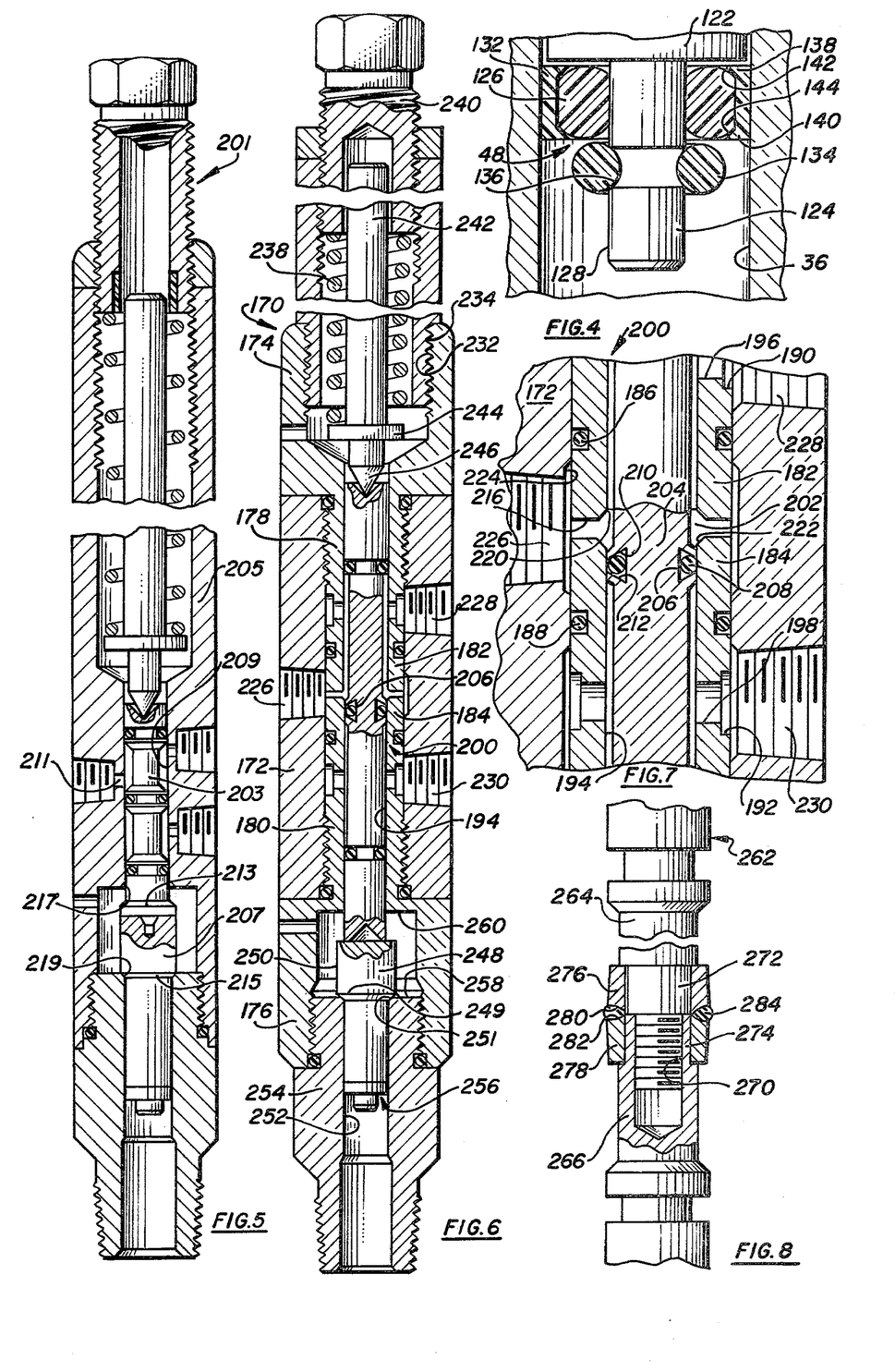
FIG. 4 is a fragmentary sectional view of the pilot valve structure of FIG. 1, illustrating the sliding piston seal, "slipper seal" in detail.
FIG. 5 is a partial sectional view of a pilot valve mechanism representing a modified embodiment of the present invention with the shuttle valve mechanism having a tapered seal in the pressure sensing end portion thereof.
FIG. 6 is a partial sectional view of a pilot valve mechanism representing a modified embodiment of the present invention with the shuttle valve mechanism employing a radially inwardly divergent peripheral groove shaped to retain an annular O-ring seal and a seal in the pressure sensing end portion thereof.
FIG. 7 is a fragmentary sectional view of the pilot valve mechanism of FIG. 6, illustrating the piston and seal elements in greater detail.
FIG. 8 is a fragmentary sectional view of a shuttle valve mechanism representing a modified embodiment of the shuttle valve mechanism shown in FIGS. 6 and 7 employing a separable seal ring support assembly to clamp an O-ring in place.

According to the present invention, one suitable construction for providing a sealing mechanism that has low friction capability to promote repeatability in operation which promotes narrow pressure range operation of pilot valve mechanisms and which also will not stick when allowed to remain stationary for long periods of time may conveniently take the form of the seal assembly indicated generally at 48 and illustrated in FIG. 4. The piston element 40 may be provided with a reduced diameter portion 122 that is received in close fitting, but non-touching relation within the bore 36. The reduced diameter portion 122 may be provided with a further reduced diameter axially extending portion 124 that receives seal assembly 48 that may be referred to as a "slipper seal assembly" and incorporates an inner soft elastomeric sealing element that serves both as a sealing element and as an urging means for a stable friction resistant element disposed thereabout.

The soft elastomeric sealing element 126 may be disposed about the generally cylindrical sealing surface 128 in sealing engagement therewith and may be received in encircled relation within a relatively thin annular sealing band 132 having exceptional sealing ability and low friction characteristics and which does not have an affinity for sticking to the cylindrical sealing surface established by the bore 36.

The slipper seal assembly may be retained in assembly with the axially extending portion 124 of the piston element 56 by an annular retainer element 134 that is received within an annular groove 136 formed in the axial extension 124 and which retainer element may conveniently take the form of an O-ring composed of any suitable elastomeric material. It should be borne in mind that slipper seal assembly 48 will be subjected to pressure from one direction only and, therefore, it is not necessary that the retainer element 134 be capable of retaining the slipper seal when the seal is subjected to fluid pressure from both directions. Retainer element 134 serves to retain the slipper seal in position on the axial extension 124 during assembly of the valve mechanism and also retains the slipper seal in position on the extension during periods when the valve mechanism is not subjected to pressure.

Slipper seal assembly 48 may comprise an annular sealing band 132 composed of a friction resistant material such as polotetrafluoroethylene, for example, which will establish sealing engagement within the bore 36, but will not be susceptible to sticking. Moreover, the slipper seal assembly may include a soft annular elastomeric sealing element having the capability of yielding to fluid pressure and enhancing the sealing ability of the sealing band. As depicted in detail in FIG. 4, an elastomeric annular sealing element 126, which also functions as an urging means, is received in close fitting relation about the reduced diameter portion 124 of the piston and is interposed between the reduced diameter portion of the piston and the annular sealing band, serving to impart radial forces to the thin sealing band that urges the peripheral portion of the sealing band into sealing engagement with the internal surface defined by bore 36.

One difficulty, attendant with the use of O-rings for the purpose of sealing under high pressure conditions, is the fact that the O-rings may tend to extrude outwardly of the O-ring recess where it may become damaged or subjected to extensive wear as it slides within the bore with which sealing contact is to be maintained. To prevent extrusion of the O-ring 134 from the groove 136, the annular sealing band 126 may be provided with a pair of annular inwardly extending flanges 138 and 140 having inwardly tapered generally frusto-conical surfaces 142 and 144 defined respectively thereon. The frusto-conical surfaces 142 and 144 provide a camming function tending to urge the annular sealing element 126 toward a centralized position between the flanges 138 and 140. Should the sealing element 126 be moved in either lateral direction, responsive to application of pressure, the annular retainer flanges 138 and 140 will effectively prevent O-ring element 126 from being extruded from the groove where it might be damaged or become excessively worn. Moreover, as soon as the pressure being sensed by the O-ring and sealing band structure has dissipated to an acceptable level, the O-ring will tend to be returned toward a centralized position between the cam surfaces 142 and 144 by the camming action of respective ones of the cam surfaces.

To establish a relatively friction-free sliding relationship between the annular sealing band 132 and the wall structure 38 of the bore, the sealing band may be composed of a material having low friction characteristics and which will not tend to become adhered to the wall structure of the bore 38. It has been determined that sealing band composed of polytetrafluoroethylene, or any other similar acceptable plastic material, may be utilized quite efficiently. The annular sealing element 132 may be composed of any one of a number of suitable elastomeric materials, depending upon the characteristics of the fluid with which it may come into contact.

Figure 3:
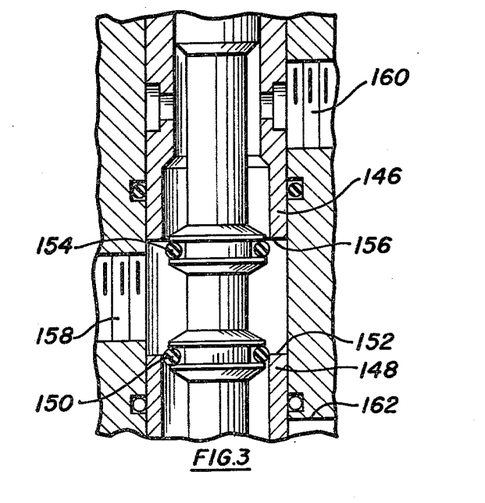
FIG. 3 is a fragmentary sectional view of a pilot valve mechanism representing a further modified embodiment of the present invention, incorporating a shuttle valve mechanism essentially as illustrated in FIGS. 1 and 2, but incorporating a pair of spaced apart annular sealing elements.

Referring now to FIG. 3, it may be desirable to provide a shuttle valve mechanism having a pair of annular O-rings instead of the single O-ring type shuttle valve element set forth in FIGS. 1 and 2. It will be desirable to space axial extensions 146 and 148 to such extent that one of the O-rings 150 will engage an annular edge 152 thereof while the opposite O-ring sealing element 154 will be disposed in slightly spaced relationship with the opposite annular edge to achieve interruption of the flow between the outlet part 158 and either of the high or low pressure parts 160 and 162.

Referring now to FIG. 6, there is disclosed a pilot valve mechanism illustrated generally at 170 which constitutes a further modified embodiment of the present invention and incorporates an intermediate body section 172 having upper body sections 174 and intermediate coupler element 176 connected thereto. Axially extending portions 178 and 180 of upper body section 174 and intermediate coupler element 176 are threadedly engaged with the intermediate body section 172 and provide valving extensions 182 and 184 that are disposed in closely spaced opposed relationship as shown in detail in FIG. 7. The valving extensions 182 and 184 are disposed in sealed relationship with the intermediate body section 172 by means of annular sealing elements 186 and 188, respectively, which may conveniently take the form of O-rings, retained within annular O-rings grooves, or in the alternative, may take any other desirable form as deemed appropriate. The valving extensions 182 and 184 may have annular grooves 190 and 192 defined in the outer peripheral portion thereof which grooves may be disposed in communication with shuttle valve element receiving bore 194 by appropriate transverse passages 196 and 198 respectively.

A valving element, illustrated generally at 200 in FIG. 7, may be disposed for reciprocal movement within the bore 194 and within an annular chamber 202 defined by the annulus existing immediately about the shuttle valve element 200 and between end portions of valving extensions 182 and 184. Shuttle valve element 204 having an annular groove 206 formed therein, which groove may receive an annular sealing element 208. The sealing element 208 may conveniently take the form of an elastomeric O-ring or any other suitable sealing device without departing from the spirit and scope of the present invention. Annular groove 206 can be formed as shown with a generally trapezoidal cross-section and having opposing sides thereof 210 and 212 divergent from the open outer portion of the groove toward the bottom or closed end portion thereof. The extension 214 of the intermediate portion of shuttle valve element 200 is reduced in diameter relative to bore 194 except for the portion adjacent to groove 206 which protrudes radially outward for support of O-ring 208 and to form outer portions of sides 210 and 212. Valving extensions 182 and 184 are respectively provided with annular facing surfaces 216 and 281 which each respectively have outwardly divergent frusto-conical inner edge surfaces intersecting bore 194 at sealing edges 220 and 222. Valve body intermediate section 172 has an enlarged annular portion 224 therein around the adjacent end portions of valving extensions 182 and 184.

It is to be noted that annular sealing element 208, when disposed in touching engagement with an annular sealing edge 222 of the valving extension 184, will be slightly spaced from the annular edge 220 on the opposite valving extension. This feature promotes rapid operation of the valve mechanism upon slight axial movement of the shuttle valve element 200, because it is only necessary that the O-ring 208 be moved a few thousandths of an inch in order to be brought into sealing engagement with the sealing edge of the opposite valving extension. Full flow communication between the outlet port 226 and one of the high pressure or low pressure ports 228 and 230, respectively, may be effectively accomplished upon slight movement of the O-ring element, responsive to slight movement of the shuttle valve 200. Further movement of the shuttle valve in either direction will merely cause the O-ring element 208 to be moved within the respective bore defined within the valving extension. Since opening and closing of the shuttle valve mechanism will occur upon slight movement of the shuttle valve, it is obvious that the pilot valve mechanism will be immediately responsive to slight pressure changes above or below the present pressure level for which actuation of the valve mechanism is desired.

Section 174 of the valve housing may be internally threaded as shown as 232 in order to receive an externally threaded portion 234 of a spring housing element 236 that also provides a cover for a compression spring 238 that is retained in assembly with an adjustment element 340 threadedly mounted in spring housing element 236. A stem 242 has a spring abutment element 244 thereof which rests in contact with one end of spring 238. Stem 242 has a conical extremity 246 to engage a conical indentation of shuttle valve element 200. Compressive force of spring 238 may be adjusted simply by rotating the adjustment element 240 relative to spring housing element 236, thereby causing the compression of the spring 238 to be increased or decreased as is desired for appropriate setting of the pressure range to which the pilot valve mechanism is responsive.

The shuttle valve element 200 may be disposed in abutment with an elarged portion 248 of a piston element 250 which piston element has a sealing portion thereof received within a bore 252 defined within a lower body section 254. A slipper seal mechanism indicated generally at 256, constructed and functioning essentially identical as compared with the slipper seal mechanism illustrated and described in connection with FIG. 4, may be provided at one extremity of the piston 250 in order to establish friction resistant sealing capability with respect to the bore 252. The enlarged portion 248 of the piston element 250 may engage abutment surfaces 258 and 260 to limit axial movement of this piston and the shuttle valve element in either aixal direction thereof. Enlarged portion 248 has a conical surface 249 on the lower end thereof which may engage a conical seat surface 251 around bore 252 at abutment surface 258 when enlarged piston portion 248 is in the lowered position as shown. The sealing surfaces are an important feature of the pilot valve mechanism of this invention because it provides a metal-to-metal seal in the pressure exposed portion of the mechanism which will seal in the event other resilient seals are destroyed such as by fire.

Referring now to FIG. 5, there is disclosed a pilot valve mechanism indicated generally at 201 which constitutes a further embodiment of the present invention and includes the basic features of pilot valve mechanism 170 shown in FIG. 6 but further includes minor changes in the shuttle valve element 203, the intermediate body portion 205, and the enlarged piston portion 207. Intermediate body portion 205 is constructed to directly contain the bore 209 which slidably receives and contains shuttle valve element 203. Shuttle valve element 203 has one enlarged intermediate portion with an O-ring seal member mounted in an annular groove therein which contacts bore 209 and moves across an outlet opening 211. Outlet opening 211 is in fluid communication with an outlet port through body intermediate portion 205. Inlet and vent ports are provided through intermediate body portion 205 in fluid communication with the valve chamber defined by the bore around shuttle valve element 203. A spring assembly is provided on the upper end of shuttle valve element 203 to urge it downward in opposition to fluid pressure acting on the pressure sensing piston. Operation and functioning of pilot valve mechanism 201 is the same as the pilot valve mechanism shown in FIG. 6.

Enlarged piston portion 207 is provided with oppositely tapered conical sealing surfaces 213 and 215 on opposing upper and lower ends thereof which engage in respective seat surfaces 217 and 219 in upper and lower portions of the chamber enclosing piston enlarged portion 207 such that metal-to-metal seating is accomplished between the piston and the valve body. This metal-to-metal seating of enlarged piston portion 207 is an important feature of this invention because such provides an auxiliary seal to prevent fluid leakage from the fluid pressure being sensed and the valve chamber. This metal-to-metal seating around enlarged piston portion 207 insures sealing in case other resilient seals are destroyed such as by a fire.

Now referring to FIG. 8, there is disclosed a shuttle valve element indicated generally at 262 which constitutes a modified embodiment of the shuttle valve incorporated in the pilot valve of this invention. Shuttle valve element 262 is an alternate or equivalent structure for shuttle valve element 200 shown in FIGS. 6 and 7 and can be substituted for shuttle valve element 56 shown in FIGS. 1 and 2. This shuttle valve element 262 includes a pair of axially aligned segments 264 and 266 joined together at a reduced diameter mid-portion thereof by a further reduced diameter externally threaded bore 270 of segment 266. Segments 264 and 266 abut a slightly reduced diameter portions 272 and 274 respectively. A pair of seal element support collars 276 and 278 encircle reduced diameter portions 272 and 274 and extend the combined axial length of these reduced diameter portions such that they are firmly retained between segments 264 and 266 when such segments are secured together. Collars 276 and 278 abut each other around inner annular portions of adjoining ends thereof and have cross-sectionally concave curved cuter portions 280 and 282 respectively which join the periphery of the collars. Such concave portions cooperate to secure sides of an annular seal element 284 which can conveniently be in the form of an elastomeric O-ring. Concave sides 280 and 282 contact the annulus portion and opposing sides of O-ring 284 with only an outer peripheral edge portion of O-ring 284 protruding from collars 276 and 278 for contacting bore 194 and sealing edges 200 and 222. Grooves 286 and 288 are provided around the large diameter opposite end portions of shuttle valve element 262 for mounting O-rings as an opposing ends of the other shuttle valve element.

Figures 9, 10, 11, 12:
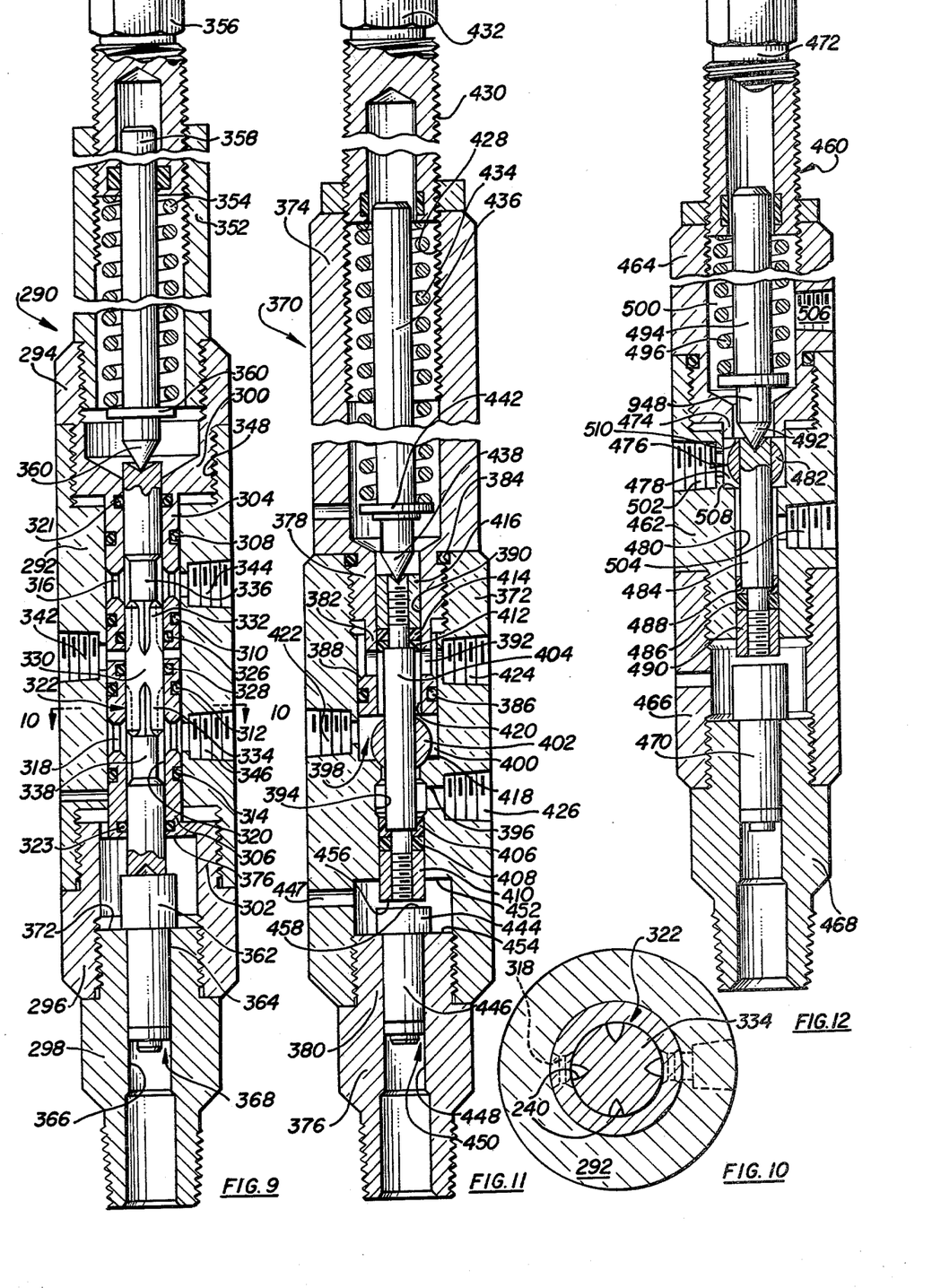
FIG. 9 is a partial sectional view of a pilot valve mechanism representing a modified embodiment of the present invention with the shuttle valve mechanism having a cylindrical mid-portion disposed between longitudinally splined portions thereof and being movable between alternate positions engaging annular seals in the valve body.
FIG. 10 is an enlarged cross-sectional view of the pilot valve mechanism shown in FIG. 9 taken on line 10—10 in FIG. 9 illustrating the arrangement thereof in greater detail.
FIG. 11 is a partial sectional view of a pilot valve mechanism representing a modified embodiment of the present invention with the shuttle valve mechanism having a spherically shaped enlarged portion of the valve element.
FIG. 12 is a partial sectional view of a portion of a pilot valve mechanism representing a modified embodiment of the present invention with the shuttle valve element having a spherically shaped enlarged portion and being in close and direct connection with the spring system.

Referring now to FIG. 9, there is disclosed a pilot valve mechanism illustrated generally at 290 which constitutes a further modified embodiment of the present invention and incorporates an intermediate body section 292 having an upper end body section 294 and an interconnecting end body section 296 connected thereto. A lower body section 298 is connected to interconnecting body section 296. Axially extending portions 300 and 302 of the body portions 294 and 296 are threadedly engaged with intermediate body section 292 and have separate respective valving or sleeve extensions 304 and 306 fitting within the central bore of body section 292 the ends of which are disposed in closely spaced opposed relationship as shown. The valving extensions 304 and 306 are disposed in sealed relationship with the intermediate body section 292 by means of annular sealing elements 308, 310, 312 and 314 respectively, which may conveniently take the form of O-rings, retained within annular O-ring grooves in the outer circumference of sleeve extensions 304 and 306, or in the alternative, may take any other desirable form as deemed appropriate. The valving extensions 304 and 306 have transverse passageways 316 and 318 through the outer peripheral portion thereof with such passageways disposed in communication with bore 320 through the valving extensions. Annular seal members 321 and 323 are provided in valving extensions 304 and 306 respectively within annular O-ring grooves around the interior of bore 320 at end portions of the bore to provide a fluid seal at opposite end portions of shuttle valve element 322. Sleeve extensions 304 and 306 thus provide separate inserts within the central bore of intermediate body section 292.

Shuttle valve element, illustrated generally at 322 is disposed for reciprocal movement within the bore 320 of sleeve inserts 304 and 306 and within an annular chamber defined by the portion of bore 320 immediately about shuttle valve element 322 and between valving extensions 304 and 306. A pair of annular O-ring sealing elements 326 and 328 are mounted in grooves inside the bore 320 of respective valving extensions 304 and 306 at the mutually adjacent ends thereof. Annular sealing elements 326 and 328 form annular sealing edges for contacting the valve element. Shuttle valve element 322 includes a central segment having an essentially cylindrically shaped mid-portion 330 forming a sealing section disposed between longitudinally fluted or splined opposed portions 332 and 334, and outer segments 336 and 338 joining splined portions 332 and 334 and supporting shuttle valve element 232 in bore 320. Outer segments 336 and 338 join splined portions 232 and 234 respectively at reduced diameter segments thereof and such are disposed in fluid communication with passageways 316 and 318. FIG. 10 shows a cross section of pilot valve mechanism 290 taken transversely through shuttle valve splined portion 334 illustrating the construction thereof in detail. Splined portion 334 is formed by a plurality of spaced grooves 240 cut in the shuttle valve element. Grooves 240 are preferably arranged in a regular spaced relation as shown in FIG. 10. The formation of grooves 240 can be done by cutting from the end the centrally enlarged portion thereof toward the center portion thereof terminating in a uniform spaced relation to ends of the centrally enlarged portion.

Grooves 240 are cut such that the sealing section 330 is slightly shorter than the distance between the annular sealing edges of sealing elements 326 and 328 so that when a seal is established between one sealing edge and cylindrical sealing section 330 there will not be a seal with the other sealing edge. This feature promotes rapid operation of the valve mechanism upon slight axial movement of the shuttle valve element 322, because it is only necessary that sealing section 330 be moved a few thousandths of an inch in order to be brought into sealing engagement with the sealing edge of the opposite valve extension. Full flow communication between the outlet port 342 and one of the high pressure or low pressure parts 344 and 346 respectively, may be effectively accomplished upon slight movement of the sealing section 330, responsive to slight movement of the shuttle valve 322. Further movement of the shuttle valve in either direction will merely cause sealing section 330 to be moved within the respective bare defined within the valving extension. Since opening and closing of the shuttle valve mechanism will occur upon slight movement of the shuttle valve, it is obvious that the pilot valve mechanism will be immediately responsive to slight pressure changes above or below the present pressurelevel for which actuation of the valve mechanism is desired.

Section 294 of the valve housing may be internally threaded as shown at 348 in order to receive an externally threaded portion 350 of a spring housing element 354 that is retained in assembly with an adjustment element 356 threadedly mounted in spring housing 352. A stem 358 has a spring abutment element 360 which rests in contact with one end of spring 354. Stem 358 has a conical extremity 360 engaging a conical indentation of shuttle valve element 322. Compression force of spring 354 may be adjusted simply by rotating the adjustment 353 relative to the threaded portion of spring housing section 352, thereby causing the tension of the spring 354 to be increased or decreased as is desired for appropriate setting of the pressure range to which the pilot valve mechanism is responsive.

The shuttle valve element 322 may be disposed in abutment with an enlarged portion 362 of a piston element 364. Piston element has a sealing portion thereof received within a bore 366 defined within a body section 298. A slipper seal mechanism indicated generally at 368, constructed and functioning essentially identical as compared with the slipper seal mechanism illustrated and described in connection with FIG. 4, may be provided at one extremity of the piston 364 in order to establish friction resistant sealing capability with respect to bore 366. The enlarged portion 362 of the piston element 364 may engage abutment surfaces 370 and 372 to limit axial movement of the piston and the shuttle valve element in either axial direction thereof.

Referring now to FIG. 11, there is disclosed a pilot valve mechanism illustrated generally at 370 which constitutes a further modified embodiment of the present invention and incorporates an intermediate body section 372 having an upper body section 374 and a lower body section 376 connected thereto. Axially extending portions 378 and 380 of the respective body portions 374 and 376 are threadedly engaged in the intermediate body section 372. A valving extension 383 extends from axial extending portion 378 into a mid-portion of intermediate body portion 372. The valving extension 382 is disposed in a sealed relationship with the intermediate body section 372 by means of annular sealing element 384 between body portions 374 and 372 and another sealing element around valving extension 378. Sealing elements 384 and 386 may conveniently take the form of O-rings, retained within annular O-ring grooves, or in the alternative, may take any other desirable form as deemed appropriate. The valving extension 378 has an annular groove 388 defined in the outer peripheral portion thereof which such groove is disposed in communication with a bore 390 by appropriate transverse passages 392. An enlarged portion 394 of bore 390 in the opposite end portion of intermediate body 372 is connected by a passageway 396 to a port.

A valving element, illustrated generally at 398 is disposed for reciprocal movement within bore 390 and within an annular chamber 400 defined by the annulus existing immediately about the shuttle valve element 398 and including the adjacent portion of bore 390. Valve element 398 has an enlarged substantially spherically shaped enlarged portion 402 rigidly mounted on a mid-portion of an elongated stem element 404 that is disposed for longitudinal sliding movement in bore 390. Stem 404 is smaller is diameter than bore 390 through the portion thereof located in valve chamber 400. Stem 404 has an annular seal support member 406, an annular seal member 408 and a seal retainer member 410 on the lower end portion thereof and a similar seal support member 412, annular seal 414, and seal retainer 416 on the opposite or upper end thereof.

It is to be noted that the annular sealing element 402, when disposed in touching engagement with the annular sealing edge 418 of intermediate body portion 372 such will be slightly spaced from the annular sealing edge 420 of the valving extension 382. This feature promotes rapid operation of the valve mechanism upon slight axial movement of the shuttle valve element 398, because it is only necessary that the sealing element 402 be moved a few thousandths of an inch in order to be brought into sealing engagement with the sealing edge of the opposite valving extension. Full flow communication between the outlet port 422 and one of the high pressure or low pressure ports 424 and 426, respectively, may be effectively accomplished upon slight movement of the O-ring element, responsive to slight movement of the shuttle valve 398. Further movement of the shuttle valve in either direction will merely cause the portion of sealing element 402 adjoining stem to be moved within the respective portion of bore 390 defined within valving extension 398 or intermediate body portion 372. Since opening and closing of the shuttle valve mechanism will occur upon slight movement of the shuttle valve, it is obvious that the pilot valve mechanism will be immediately responsive to slight pressure changes above or below the preset level for which actuation of the valve mechanism is desired.

Section 374 of the valve housing may be internally threaded as shown at 428 in order to receive an externally threaded portion 430 of a spring adjustment element 432 that also provides a cover mechanism for a compression spring 434. One end of spring 434 abuts a shoulder inside spring adjustment element 432. An elongated force transmitting stem 436 extends through spring 434 into spring adjustment element 432 and has a conical lower end portion 438 resting in a conical depression in the upper end of valve stem 404. A collar 440 of friction resistant material is located in an internal annular groove in spring adjustment element 432 to contact force transmitting stem 436. A spring abutment element 442 is rigidly secured to force transmitting stem 436 and abuts the lower end of spring 434. The tension of the spring 434 may be adjusted simply by rotating the adjustment element 432 relative to the threaded portion 428 of housing section 374, thereby causing the tension of the spring 434 to be increased or decreased as is desired for appropriate setting of the pressure range to which the pilot valve mechanism is responsive.

The shuttle valve element 398 may be disposed in spaced relation to an enlarged portion 444 of a piston element 446 which has a sealing portion thereof received within a bore 448 defined within a body section 376. A slipper seal mechanism 450, constructed and functioning essentially identical as compared with the slipper seal mechanism illustrated and described in connection with FIG. 4, is provided at the lower extremity of the piston 446 in order to establish friction resistant sealing capability with respect to the bore 448. A vent passageway 447 connects the chamber enclosing piston end 444 to the atmosphere through body section 372. The enlarged portion 444 of the piston element 446 may engage abutment surfaces 452 and 454 to limit axial movement of the piston in either axial direction thereof. It is to be noted that piston 446 is a member separate from shuttle valve element 398. The lower end 456 of shuttle valve element 398 is spaced from the upper end 458 of piston 446 when the piston is in the lowered position as shown, such that spherical valve element 402 will contact sealing edge 418 under the full force from spring 434. Where fluid pressure raises in bore 448 piston 446 is displaced upward contacting shuttle valve lower end 456 and unseating spherical valve element 402. The spacing of shuttle valve element end 456 and piston upper end 458 is necessary to insure positive seating of spherical valve element 402.

Referring now to FIG. 11, there is depicted a modified embodiment of the shuttle valve mechanism of this invention, the modification relating to the shuttle valve mechanism and upper portion of the valve body. The pilot valve mechanism of this embodiment is generally indicated at 460 and includes an intermediate body section 462 having a threadedly mounted upper body section 464 and a lower body intermediate coupler 466. A lower body section 468 is threadedly mounted on the lower end of lower body intermediate coupler 466 with piston 470 enclosed therein. Upper body section 464 threadedly mounts spring adjustment element 472 on the upper end thereof and has an axial extension on the lower end thereof with the inner end most portion being a valving extension 474. Shuttle valve element, indicated generally at 476, is enclosed in a chamber 478 defined by the zone immediately therearound and adjoining portions of the bore 480, and includes a substantially spherically shaped valve element 482 mounted on one end portion of a valve stem 484 slidably disposed in bore 480. Stem 484 is substantially smaller in diameter than bore 480 and has an annular seal element 486 supported between a collar 488 and a retainer member 490 which engage bore 480 to guide the lower end of stem 484. Valve stem 484 has a conical depression in the upper end thereof to receive a conical end portion 492 of a spring force transmitting stem 494. Spring stem 494 is centrally disposed through a compression spring 496 enclosed in body section 462. Spring stem 494 is smaller in diameter on the lower end portion 984 which extends through the portion of bore 480 in valving extension 474. Because lower spring stem portion 948 is smaller than bore 480 fluid communication is established between valve chamber 478 and the spring chamber 500.

Intermediate valve body section 462 contains outlet port 502 which communicates with valve chamber 478 and inlet port 604 which communicates with bore 480 below chamber 478. Bleed port 506 is located in upper body section 464 communicating with spring chamber 500. Spherical valve element 482 contacts a sealing edge 508 in intermediate body section 462 when in the lowered position as shown in FIG. 12 and when in the raised position the opposite side of the spherical valve element 482 is in sealing contact with either sealing edge 508 or 510, the end portion thereof extends into bore 480 and beyond the associated sealing edge. Further, it is to be noted that the pilot valve mechanism of this embodiment has a piston and slipper seal structure similar to that shown in FIG. 11 and described in conjunction therewith.

OPERATION

Referring to the pilot valve mechanism shown in FIG. 1 and assuming that a pair of such mechanisms are connected in a high-low series relation, both mounted on a common manifold and operably connected in a safety system as described above, both the high and low pressure pilot valve mechanisms will be disposed in the non-venting position thereof as long as pressure communicated into the manifold is within a normal operating range. If, for some reason, the pressure should fall below the operating range, the tension spring will urge the shuttle valve 58 downwardly, in both pilot valve mechanisms, thereby causing sealing element 120 thereof to engage the lower annular sealing edge 96, causing the supply of pilot pressure to be blocked and allowing pilot pressure medium from the associated valve and actuator assembly to be communicated through a conduit to port 106 of the high pressure pilot valve and through a conduit connecting the pilot valves and through the low pressure pilot valve to the bleed port 104 thereof where it will be vented to the atmosphere, or in the alternative, will be conducted to a suitable receiver for disposal. As discussed above, only slight axial movement of the piston and shuttle valve element is necessary to achieve full opening of a flow passage area through the pilot valve assembly that is at least as great as the dimension of the bleed and pilot supply passages. The valve actuator will, therefore, vent quite rapidly, allowing rapid shut-in of the valve with which the actuator is associated. The high pressure pilot, under these conditions, will remain in the position illustrated in FIG. 1 with the shuttle valve element 58 in its lowermost position.

In the event fluid pressure within the manifold should become excessive, such pressure in the high pressure pilot valve mechanism acting upon the piston assembly 40, will urge the shuttle valve element 58 upward, thereby blocking communication between conduits 106 and 104 and opening communication between conduit 106 and the vent port 102. Pressurized medium within the valve actuator, under this circumstance, will be allowed to vent through the bleed port 102 of the high pressure pilot valve mechanism and the valve actuator and valve assembly will again be immediately moved to a predetermined safe condition. It is, therefore, evident that the pilot valve construction of the present invention may be utilized either as a high or low pressure sensing pilot, depending solely upon the parameters of design. It is also obvious that the pilot valve mechanism of the present invention may be efficiently utilized separately for single pressure function control of a remotely located pilot pressure operated device, such as valve actuator and valve assembly.

The pilot valve mechanism of the present invention has been found through tests to have excellent repeatability even though narrow ranges of pressure variation are involved. Repeatability and accuracy of the pilot valve mechanism is accomplished largely through the use of relatively friction-free piston sealing means and through the use of a tension spring for developement of force urging the piston and shuttle valve assembly downwardly against the influence of pressure within the pressure system being monitored. Repeatability and accuracy is further enhanced by the fact that the shuttle valve element need move only a slight distance from the annular sealing surface in order to allow full opening of a flow passage through the valve chamber, which opening is at least equal to the dimension of the port through which the pilot fluid is to flow either during supply or venting. The pilot valve mechanism of the present invention also includes sealing elements for both the piston mechanism and the shuttle valve assembly which sealing elements are prevented by appropriate retainer means from being displaced by fluid pressure. Moreover, the seal assembly for the piston mechanism incorporates a relatively friction-free sealing element that is urged by an O-ring or other suitable urging means into proper sealed engagement with the wall structure of the bore within which the piston is movably disposed. The friction-free sealing element, because of its composition, will not tend to adhere to the wall structure of the piston bore and, therefore, will not influence operating characteristics of the valve mechanism.

In view of the foregoing it is apparent that the present invention is one well adapted to attain all of the objects hereinabove set forth, together with other advantages which will become obvious and inherent from a description of the apparatus itself. It will be understood that certain combinations and subcombinations are of utility and may be employed without reference to other features and subcombinations. As many possible embodiments may be made of this invention without departing from the spirit or scope thereof, it is to be understood that all matters herein set forth or shown in the accompanying drawings are to be interpreted as illustrative and not in a limiting sense.

What is claimed is:

1. A quick bleeding pressure responsive pilot valve mechanism for rapidly bleeding a pilot controlled control pressure system responsive to sensing of an unsafe condition in a pressurized primary system, said pilot valve mechanism comprising:
   a valve body including an intermediate section and end sections threaded within the intermediate section, said end sections including integral sleeve extensions fitting within the intermediate section in end-to-end spaced relation and forming a central bore defining a valve chamber, said valve body having an inlet port, an outlet port, and a vent port communicating with the central bore of said valve chamber;
   an elongated shuttle valve element being positioned for longitudinal movement within the central bore of the sleeve extensions defining said valve chamber;
   said valve element having a central segment defining a cylindrical mid-portion and a splined end portion adjacent each end of the cylindrical mid-portion, each splined end portion defining a plurality of circumferentially spaced grooves extending longitudinally of the central segment;
   a pair of spaced inner O-rings mounted in annular grooves about the inner circumference of said sleeve extensions on opposite sides of said outlet port and engaging said valve element in sealing relation, said mid-portion of the central segment being of a slightly smaller longitudinal dimension than the spacing of said inner O-rings, the grooves on one splined end portion being in fluid communication with said inlet port and the grooves on the other splined end portion being in fluid communication with said vent port;
   a pair of spaced outer O-rings mounted in annular grooves about the outer circumference of the sleeve extensions engaging said intermediate section in sealing relation, one of said outer O-rings being between the outlet port and the vent port, and the other of said outer O-rings being between the outlet port and the inlet port;
   said valve element upon sealing engagement between said cylindrical mid-portion and one of said inner O-rings establishing fluid communication between said inlet port and said outlet port through the associated grooves on one end portion and blocking fluid communication of said vent port with said inlet and outlet ports, and when in engagement with the other inner O-ring blocking fluid communication of said inlet port with said vent and outlet ports while at the same time establishing fluid communication between said outlet and vent ports through the associated grooves on the other end portion;
   primary pressure sensing and valve element displacing means in said valve body operably connected to said shuttle valve element and adapted to be placed in direct fluid communication with said pressurized primary system to cause said valve element to be urged in one direction by force thereon induced thereon by the pressure of said primary system; and
   biasing means within said valve body opposing movement of said valve element.

2. A quick bleeding pressure responsive pilot valve mechanism for rapidly bleeding a pilot controlled control pressure system responsive to sensing of an unsafe condition in a pressurized primary system, said pilot valve mechanism comprising:
   an elongated hollow intermediate body portion having a longitudinal extending central opening and internally threaded ends, said intermediate body portion having an inlet port, an outlet port and a vent port in communication with the longitudinal opening;
   a pair of externally threaded end sections in threaded engagement with the internally threaded ends of the intermediate body portion, each end section having an integral sleeve extension fitting within the opening of the body portion, said sleeve extensions forming a central bore defining a valve chamber and being in closely spaced end-to-end relation at the outlet port to define the size of the outlet port; and
   an elongated shuttle valve element positioned within the central bore defined by the sleeve extensions, said shuttle valve element movable between one position establishing fluid communication between said inlet port and said outlet port, and another position establishing fluid communication between said outlet port and said vent port.

3. A pilot valve mechanism as set forth in claim 2 wherein said outlet port is positioned longitudinally of said intermediate body portion between the inlet and vent ports.

4. A pilot valve mechanism as set forth in claim 3 wherein an O-ring is positioned between the sleeve extensions and said intermedite body portion on each side of said outlet port to provide a sealing relation therebetween.

5. A quick bleeding pressure responsive pilot valve mechanism for rapidly bleeding a pilot controlled control pressure system responsive to sensing of an unsafe condition in a pressurized primary system, said pilot valve mechanism comprising:
   a generally cylindrical intermediate body portion having a longitudinally extending central opening threaded adjacent each end thereof, said intermediate body portion having an outlet port in communication with the central opening;
   a pair of threaded end sections in threaded engagement with the threaded ends of the intermediate body portion, each end section having an integral sleeve extension fitting within the central opening of the body portion, said sleeve extensions having opposed ends in closely spaced end-to-end relation at the outlet port intermediate the length of said intermediate body portion and forming a central bore defining a valve chamber, said opposed ends forming a restriction at the outlet port to define the minimum size of said outlet port;

an inlet port and a vent port extending through said intermediate body portion and adjacent sleeve extension on opposite sides of the outlet port longitudinally of the intermediate body portion to provide fluid communication with the valve chamber; and an elongated shuttle valve element positioned within the central bore defined by the sleeve extensions, said shuttle valve element movable between one position establishing fluid communication between said inlet port and said outlet port and another position establishing fluid communication between said outlet port and said vent port.

* * * * *